Dec. 23, 1930. B. DICK 1,786,231
HYDRAULIC BRAKE APPARATUS
Filed July 11, 1928
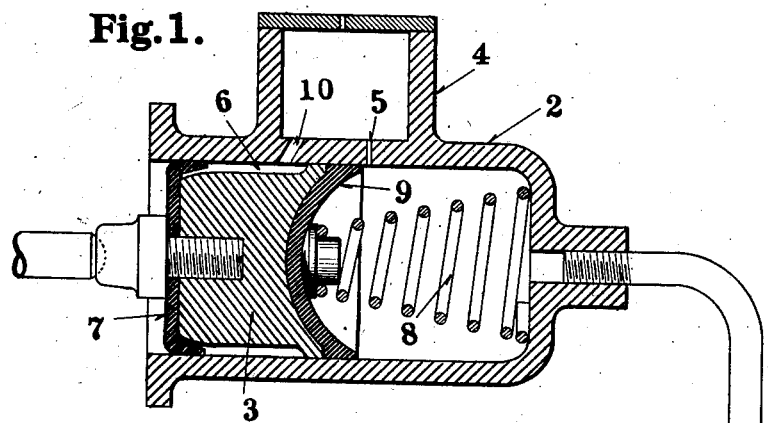
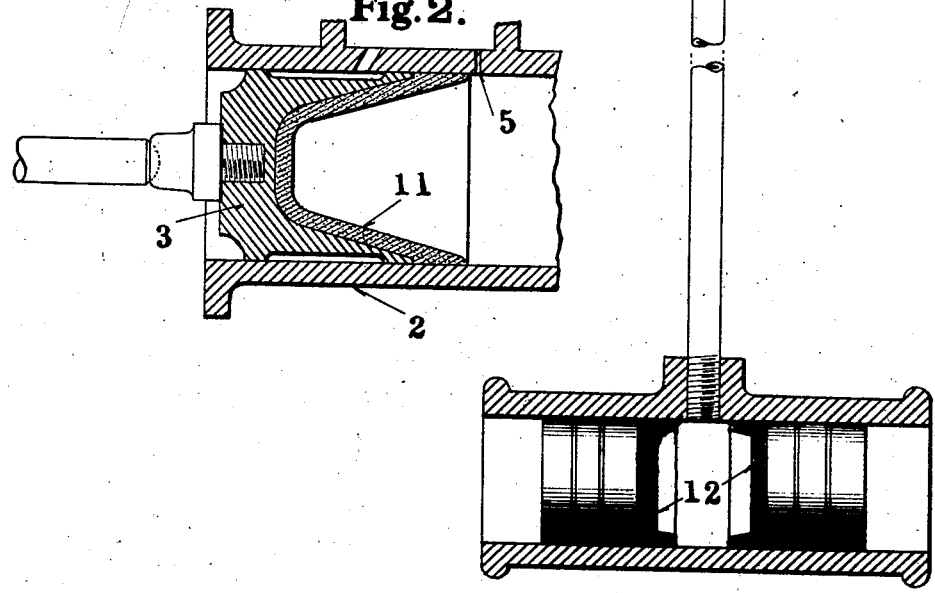
Inventor
Burns Dick
By E. S. Huffman
Att'y.

Patented Dec. 23, 1930

1,786,231

UNITED STATES PATENT OFFICE

BURNS DICK, OF ST. LOUIS, MISSOURI, ASSIGNOR TO WAGNER ELECTRIC CORPORATION, OF ST. LOUIS, MISSOURI, A CORPORATION OF DELAWARE

HYDRAULIC BRAKE APPARATUS

Application filed July 11, 1928. Serial No. 291,724.

My invention relates to piston sealing means adapted for use in the master cylinder of hydraulic braking apparatus and in other situations in which similar conditions exist.

It is the practice to employ in the cylinders of hydraulic braking apparatus a sealing member of rubber, leather, or other material on the forward end of the piston to prevent leakage of liquid past the piston and these sealing members have been substantially flat disks which have sometimes been provided with a peripheral flange or extension to bear on the cylinder wall and capable, due to its flexibility, of being pressed firmly against the cylinder wall by the liquid pressure developed in operation. These flanges are usually made somewhat over-size with respect to the cylinder diameter in order that their resilience may hold them firmly against the cylinder wall.

Hydraulic braking apparatus comprises a central master cylinder to the piston of which the operator of a vehicle may apply pressure, and cylinders at the wheels carrying pistons for actuating the brake members. There is usually associated with the master cylinder a liquid reservoir by means of which liquid which has leaked past any of the pistons may be restored to the pressure system, and it is desirable that the piston of the master cylinder be always returned to the same position when the brakes are released in order that the supply port connecting the liquid reservoir with the closed portion of the master cylinder may communicate with this portion. To bring about this full return of the master piston a spring means or equivalent is provided. If the sealing cup in the master cylinder bears too firmly on the walls of the cylinder air may be drawn into the system past the sealing cups in the wheel cylinders during the rearward motion of the master cylinder piston. If the pressure of the sealing cup against the master cylinder walls, due to the cup's resiliency, is light, the cup will not be efficient to prevent leaks past the piston during brake application.

In order that air be not permitted to enter the closed portion of the master cylinder during the return movement of the master cylinder piston a liquid containing space is usually formed between the cylinder wall and the central portion of the periphery of the piston whereby liquid rather than air may pass the sealing cup into the closed portion of the master cylinder, and that liquid may thus pass it is necessary that the rim of the cup yield inwardly. But, as above indicated, if too much pressure is required to make it yield there is likelihood, in the absence of a back pressure valve in the connection between the wheel cylinder and the master cylinder, that the high vacuum created by the rearward motion of the cup would draw air into the system at a wheel cylinder. Sealing cups which have heretofore been used have had a flat base and a narrow peripheral flange with the result that considerable pressure was necessary to bring about sufficient yielding to permit by-pass of liquid.

The purpose of my invention is to form a sealing cup and piston construction whose operating characteristics will be substantially better than the prior type of construction above described.

In Figure 1 I have shown, partly in elevation and partly in section, a master cylinder and piston provided with a sealing cup constructed in accordance with my invention, the figure also diagrammatically indicating the remainder of the hydraulic parts of the braking apparatus by showing one of the wheel cylinders and cooperating pistons as connected with the master cylinder; and Figure 2 illustrates another specific form of the sealing cup.

Referring to Figure 1, 2 represents the master cylinder and 3 the piston reciprocating therein, this piston being actuated by the brake pedal (not shown). Associated with the master cylinder is a reservoir 4 of the liquid used in the system for transmitting the braking pressure. This reservoir communicates with the master cylinder through the port 5 which port is so located as to be just uncovered when the piston and sealing cup are at their rearward limit of travel. The port permits the ingress and egress of liquid from the master cylinder due to expansion and contraction of the liquid under the influence of temperature changes and also supplies to the master cylinder a portion of the liquid which may be lost by leaks past any of the sealing cups and pistons in the apparatus. Part of the liquid needed to supply leakage loss is brought into the pressure side of the master cylinder through or around the piston head and between the cylinder wall and the periphery of the sealing cup 9, a supply of liquid for this purpose being always maintained in the annular chamber 6 formed by reducing the diameter of the central portion of the piston body. This chamber is in communication with the reservoir 4 through port 10, as shown. To seal the liquid in this space the sealing cup 7 on the rear end of the piston is provided.

In order to accomplish my object of improving the operation of the master cylinder sealing cup I have made this cup 9, as shown in the figure, of hemi-spherical or "dome" shape forming a correspondingly shaped recess in the piston in which the cup seats. By giving the sealing cup this conformation I bring the body of the cup substantially to the rear of any cylinder contacting portion of its rim and thereby permit the rim to be moved inwardly to a particular degree under a lower pressure than if the base of the cup were flat. This is due to the fact that substantially all of the separation of the rim from the cylinder wall is against the bending resistance only of the body of the cup, rather than a substantial part of it being against the compression resistance of the material of the cup as in cups of the flat base type heretofore used.

The normal pressure of the cup rim on the cylinder wall may be made the same as in a flat base type of cup and yet my improved cup will yield to a greater degree under a given pressure than the flat base type of cup and therefore form a larger opening for the passage of the liquid. This reduces the vacuum produced by the return motion of the piston under the condition of an under supply of liquid in the system and therefore avoids the danger of air being drawn in past the wheel cylinder pistons and cups 12. As shown, the cup is preferably not rigidly secured to its seat in the piston face but is held against the seat by the spring 8. I have found that the rubber cups of the conformation shown in Figure 1 operate satisfactorily. If the material used for the cups should be of less resilience than rubber the piston recess and the cup 11 may be made deeper, as shown in Figure 2.

Having fully described my invention, what I claim as new and desire to secure by Letters Patent of the United States is:

1. In apparatus of the class described, a liquid containing cylinder, a reciprocating piston operating therein, said piston having a recess in its forward end, and a sealing cup of resilient material having its body portion in said recess and having a sealing rim extending in advance of the piston and bearing on the cylinder wall and engaging the peripheral portion of the face of the forward end of the piston.

2. In apparatus of the class described, a liquid containing cylinder, a reciprocating piston operating therein, said piston having a relatively deep central recess in its forward end, a sealing cup of resilient material having its body portion in said recess and having a sealing rim extending in advance of the piston and bearing on the cylinder wall and engaging the peripheral portion of the face of the forward end of the piston, and means for maintaining a body of liquid in the cylinder rearwardly of the sealing cup.

3. In apparatus of the class described, a fluid pressure cylinder, a reciprocating piston operating therein and provided with a recess in its forward end, and a piston sealing cup formed of material resilient under compression and having its body portion within said recess and its rim engageable by the peripheral portion of the face of the piston and so dimensioned in relation to the cylinder bore that the inherent resilience of the material tends to maintain the rim in pressure contact with the wall of the cylinder, the conformation of the sealing cup being such that the greater part of its inner surface is positioned substantially to the rear of any cylinder contacting portion of its rim, whereby the rim may be brought out of contact with the cylinder wall without substantial compression of the cup material.

In testimony whereof, I hereunto affix my signature, this 9th day of July, 1928.

BURNS DICK.